United States Patent [19]

Lockwood et al.

[11] 4,011,180

[45] Mar. 8, 1977

[54] NOVEL COCATALYST SYSTEM FOR TRIMERIZING POLYISOCYANATES

[75] Inventors: Robert J. Lockwood, East Haven; Harold E. Reymore, Jr., Wallingford; Edward J. Thompson, Watertown, all of Conn.

[73] Assignee: The Upjohn Company, Kalamazoo, Mich.

[22] Filed: May 2, 1975

[21] Appl. No.: 573,908

Related U.S. Application Data

[62] Division of Ser. No. 437,780, Jan. 30, 1974, Pat. No. 3,896,052.

[52] U.S. Cl. .................. 260/2.5 AW; 260/2.5 AC; 260/431; 428/310; 428/313; 428/314
[51] Int. Cl.$^2$ .................. B32B 5/20; C08G 18/18
[58] Field of Search .............. 260/2.5 AW, 2.5 AC, 260/431 C; 428/310, 313, 314

[56] References Cited

UNITED STATES PATENTS

| | | |
|---|---|---|
| 3,516,950 | 6/1970 | Haggis .............................. 260/858 |
| 3,801,421 | 4/1974 | Allen et al. .................. 260/2.5 AW |
| 3,814,659 | 6/1974 | Nadeau ........................ 260/2.5 AW |
| 3,903,346 | 9/1975 | DeLeon et al. ..................... 428/313 |

*Primary Examiner*—Donald E. Czaja
*Attorney, Agent, or Firm*—James S. Rose; Denis A. Firth

[57] ABSTRACT

A novel catalyst combination for the trimerization of polyisocyanates to polyisocyanurates is disclosed. The catalyst combination comprises (i) an alkali metal salt of an N-substituted amide, (ii) an alkali metal salt of an N-(2-hydroxyphenyl)methyl glycine, and optionally a tertiary amine trimerization catalyst. The use of these catalyst combinations in the preparation of polyisocyanurate foams results in the facile continuous formation of laminate board stock. The polyisocyanurate foams produced using the novel catalyst combinations of the invention are characterized by having high resistance to heat distortion and volume change.

26 Claims, No Drawings

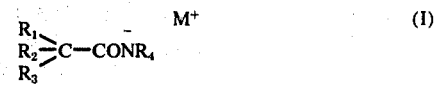

NOVEL COCATALYST SYSTEM FOR TRIMERIZING POLYISOCYANATES

CROSS REFERENCE TO RELATED APPLICATION

This application is a division of our copending application Ser. No. 437,780 filed January 30, 1974, now U.S. Pat. No. 3,896,052.

BACKGROUND OF THE INVENTION

1. Field of the Invention

This invention relates to the preparation of polymer foams and is more particularly concerned with novel catalyst combinations for the trimerization of polyisocyanates to polyisocyanurates and their utilization in the preparation of polyisocyanurate foams.

2. Description of the Prior Art

Rigid polyisocyanurate foams having high resistance to flame and heat as well as excellent thermal insulating capacity are known in the art. The prior art discloses methods for preparing such foams by reacting an organic polyisocyanate with a trimerizing catalyst in the presence of a blowing agent, and a minor proportion (usually less than 0.5 equivalent per equivalent of polyisocyanate) of a polyol; see for example U. S. Pats. No. 3,516,950, 3,580,868, 3,620,986, 3,625,872, and 3,725,319. The process described in U. S. Pat. No. 3,745,133 discloses the use of a combination of an epoxide and a tertiary amine as cocatalysts.

It will be recognized by one skilled in the art that the method referred to hereinabove requires the foaming process to proceed in conjunction with at least two polymer forming reactions; namely, the isocyanurate formation arising from the homopolymerization of the isocyanate employed, and the minor amount of polyurethane formation arising from the reaction of a polyol with the isocyanate. Difficulties arise, particularly in commercial applications due to the variation in the rates of the two polymerization reactions. The polyurethane formation initiates before the trimerization formation thus giving two separate rise steps in the overall foam rise profile.

These difficulties are accentuated in the case of the preparation of polyisocyanurate foam laminate board stock. The preparation of the latter requires a foam rise profile which is both rapid in rise time, and cures at a rate, sufficient to provide good adhesion to the facing materials which form an integral part of the laminate board. However, because of the critical role which the nature and proportion of catalyst plays in the preparation of polyisocyanurate foams of the type referred to hereinabove, it has not hitherto been possible to prepare polyisocyanurate foam laminate board stock possessing optimum properties of adhesion, physical strength, and in particular, low volume change upon exposure to elevated temperatures. This latter property is of particular importance to the end use application of polyisocyanurate foam laminate board stock wherein the laminate is being subjected to extremes in temperature, such as in roof decking.

We have now found a catalyst system which is free from the above difficulties and which is particularly useful in the preparation of foam laminates.

SUMMARY OF THE INVENTION

This invention comprises a cocatalyst system for the trimerization of a polyisocyanate which cocatalyst system comprises:

a. from about 33 to about 67 mole percent of an amide salt having the formula

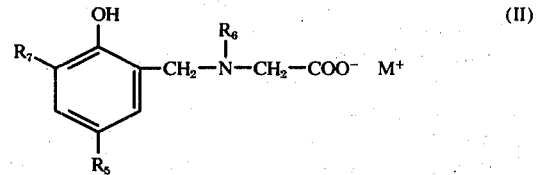

wherein M is an alkali metal, $R_1$, $R_2$, $R_3$, can be the same or different and are selected from the group consisting of H, lower-alkyl, aryl, aralkyl, and cycloalkyl, $R_4$ is selected from the group consisting of lower-alkyl and aryl; and b. from about 33 to about 67 mole percent of a gylcine salt having the formula

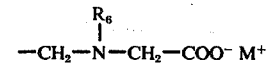

wherein M is an alkali metal, $R_5$ is selected from the class consisting of hydrogen and alkyl having from 1 to 12 carbon atoms, inclusive, $R_6$ is selected from the class consisting of hydrogen, alkyl having from 1 to 12 carbon atoms, inclusive, and $-CH_2-COO^- M^+$, and $R_7$ is selected from the class consisting of hydrogen and the group $$-CH_2-\overset{R_6}{\underset{|}{N}}-CH_2-COO^- M^+$$

The term lower alkyl means alkyl having from 1 to 8 carbon atoms, inclusive, such as methyl, ethyl, propyl, butyl, pentyl, hexyl, heptyl, octyl, and isomeric forms thereof. The term aryl means the radical obtained by removing one nuclear hydrogen atom from an aromatic hydrocarbon and is inclusive of phenyl, tolyl, xylyl, naphthyl, biphenylyl, and the like. The term aralkyl is inclusive of benzyl, p-methylbenzyl, p-ethylbenzyl, β-phenylethyl, benzohydryl, naphthyl methyl, and the like. The term cycloalkyl is inclusive of cyclobutyl, cyclopentyl, cyclohexyl, methyl cyclohexyl, cycloheptyl, cyclooctyl, and the like. The term alkali metal means sodium, potassium, and lithium.

The term alkyl having from 1 to 12 carbon atoms, inclusive means methyl, ethyl, propyl, butyl, pentyl, hexyl, heptyl, octyl, nonyl, decyl, undecyl, dodecyl, and isomeric forms thereof.

The invention also comprises an improved process for the preparation of flame and heat resistant cellular polymers, particularly in the form laminates in which the major recurring polymer unit is isocyanurate which process comprises bringing together, in the presence of a blowing agent, a polyisocyanate, a minor amount of a polyol, and a cocatalyst system as recited hereinabove.

The invention also comprises the cellular polymers produced in accordance with the above process.

DETAILED DESCRIPTION OF THE INVENTION

The process of preparing flame and heat resistant polyisocyanurate cellular polymers is well-known in the art; see the references cited supra. A particularly useful class of such foams are those described at length in U.

S. Pat. No. 3,745,133 the disclosure of which, in its entirety, is incorporated herein by reference.

This latter patent describes, inter alia, the use of a cocatalyst system comprising a particular group of epoxides, defined as monomeric polyfunctional epoxides having at least two epoxide groups, and a particular group of tertiary amines.

The polyisocyanurate cellular polymers of the type produced in accordance with U. S. Pat. No. 3,745,133 possess excellent fire and heat resistant properties and dimensional stability under adverse conditions. However, the polymers made in accordance with said patent possess a foam rise profile consisting of two separate rise times. The separate rise times occur because of the initial, faster polyurethane formation between the minor amount of polyol contained therein with the polyisocyanate and the slower polyisocyanurate formation arising from the homopolymerization of the polyisocyanate. It is recognized by those skilled in the foam art that foam rise characteristics, when considered in terms of the overall rate of rise, are usually divided into three general categories. The slowest rise times are associated with the preparation of bun stock while the fastest rise times are necessary for spray foam application. Intermediate between these two extremes are the rise times most advantageous in the preparation of foam laminate material wherein the reactants are deposited on a moving substrate which forms one facing material of the resulting laminate while a second facing material is being continuously applied to the rising cellular mass at the proper rate to form the opposing face. The rise characteristics of a foam suitable for continuous laminate preparation play a critical role in the formation of a uniformly sized laminate board having proper contact and adhesion between the foam and the facing material.

It is an object of the present invention to prepare high temperature and fire resistant polyisocyanurate cellular polymers in the form of laminate board stock by the use of a novel combination of catalysts set forth above. It is a further object of the present invention to provide a cocatalyst combination wherein the combination provides the catalysis which results in the formation of polyisocyanurate foam having the appropriate rise times required for optimum laminate formation. In addition to providing the rise times thereof, the catalyst combination of the invention overcomes the difficulties referred to hereinbefore when a polyisocyanurate reaction is combined with a polyurethane reaction. In an unexpected advantage which flows from the cocatalyst combination of the invention it has been found that while providing foam rise times which are rapid enough for laminate formation, cream and initiation times are not too rapid and cure rate is good. These factors all combined, provide for optimum laminate formation and properties thereof. This cocatalyst combination will now be discussed in more detail.

The cocatalyst components are brought together during or immediately prior to the trimerization reaction of the polyisocyanate. In an optional step, the amide salt (I) and the glycine salt (II) can be premixed or stored as a mixture.

The components of the catalyst combination of the invention and the concentration ranges of said components are set forth hereinbelow in detail in the form of mole percentages. It is to be understood that the sum total of the individual mole percent concentrations chosen for each component must equal 100 mole percent. It is also to be understood that the concentration of one component can be varied within the specified ranges so long as the appropriate adjustment is made in the remaining component so that the total equals 100 mole percent. This method of indicating the proportions of the two components of the cocatalyst is adopted in defining the parameters of the cocatalyst itself. However, when particular embodiments of the use of the cocatalyst are described hereinbelow, e.g. in the preparation of a polyisocyanurate cellular polymer, the amounts of the components of the cocatalyst will be set forth in absolute terms.

1 The amide salt component of the cocatalyst system having the formula (I), is advantageously employed in a proportion in the range of from about 2 mole percent to about 98 mole percent of the cocatalyst and, preferably in the range of from about 33 mole percent to about 67 mole percent. The compounds of formula (I) are prepared by bringing together under anhydrous conditions the appropriate acid salt of formula

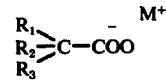

dissolved in a solvent, with the appropriate organic isocyanate of formula $R_4NCO$ wherein $R_1$, $R_2$, $R_3$, $R_4$, and M have the significance defined above. The isocyanate is added slowly to the salt solution whereupon an exotherm occurs and carbon dioxide is evolved. Examples of solvents for fthe above reaction include low molecular weight polyols such as ethylene glycol, diethylene glycol, dipropylene glycol, dibutylene glycol, tetraethylene glycol, glycerol, the liquid polyethylene glycols such as the polyoxyethylene glycols prepared by the addition of ethylene oxide to water, ethylene glycol or diethylene glycol, and the like; Cellosolve, butyl Cellosolve, Carbitol, methyl Carbitol, burtyl Carbitol, and the like; ethanolamine, diethanolamine, triethanolamine; and dipolar aprotic solvents such as dimethyl formamide, dimethyl acetamide, N-methylpyrrolidone, dimethyl sulfoxide, and the like; and mixtures of any of the aforesaid solvents. The reaction between the acid salt and the isocyanate compound is so much faster than the reaction between the isocyanate compound and the hydroxyl containing solvents, that the rate difference allows the use of the latter as a preferred class of solvents.

The preparation of the compounds of formula (I) is illustrated by the following equation:

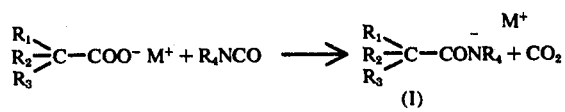

In an optional step the reaction solvent can be removed; however, it is usually found advantageous to leave the salt dissolved in the solvent and thereafter use the catalyst in combination with its diluent. When the solvent is removed, the amide salt can be used in its isolated form; however, precautions should be taken to protect it from atmospheric moisture prior to its use in the cocatalyst combination.

Typical examples of the starting acid salt include: sodium acetate, potassium acetate, lithium acetate, sodium propionate, potassium propionate, lithium propionate, sodium hexanoate, potassium hexanoate, lithium hexanoate, potassium dodecanoate, potassium 2-methylhexanoate, potassium 2-ethylhexanoate, potassium neopentanoate, sodium phenylacetate, potassium phenylacetate, lithium phenylacetate, potassium β-phenylpropionate, potassium p-tolylacetate, potassium cyclohexylacetate, potassium 4-methylcyclohexylacetate, potassium β-cyclohexylpropionate, and the like. Typical examples of the starting organic isocyanate include: butyl isocyanate, octyl isocyanate, decyl isocyanate, phenyl isocyanate, tolyl isocyanate, and the like. The proportions of reactants employed in preparing the compound (I) are in the molar ratio of 1:1.

A particularly preferred species of amide salt having the formula (I) is potassium N-phenyl-2-ethylhexamide.

In a preferred embodiment of the invention the salt (I) is employed in the cocatalyst in combination with a diluent. The diluent can be the reaction solvent, or mixtures thereof, employed in the preparation of compound (I). A particularly preferred class of diluents consists of ethylene glycol, diethylene glycol, polyethylene glycol 400, and mixtures thereof and mixtures of this preferred class with dimethyl formamide. A particularly preferred diluent mixture consists of ethylene glycol and dimethylformamide. The concentration of the salt (I) dissolved in the diluent is not critical and can vary from about 25 percent to about 75 percent by weight. When a mixture of diluents is used, the proportion by weight of one diluent in the other is advantageously from about 10 to about 90 percent by weight, and preferably from about 25 to about 75 percent by weight.

2. The second component of the cocatalyst system, namely, the alkali metal salt of the N-(2-hydroxyphenyl)-methyl glycine of formula (II), is advantageously employed in a proportion in the range of from about 2 mole percent to about 98 mole percent of the cocatalyst and, preferably, in the range of from about 33 mole percent to 67 mole percent. The compounds of formula (II) are prepared by bringing together, under Mannich forming reaction conditions, for example, those taught in "Organic Reactions," Vol. I, p. 303, John Wiley and Sons, New York, 1942, the appropriate phenol of formula

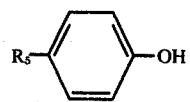

with formaldehyde in a solvent, and the appropriate alkali metal glycine salt (III) of formula

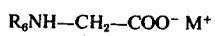

wherein $R_5$, $R_6$ and M have the significance defined above. The preparation of the compounds of formula (II) in which $R_7$ is hydrogen is illustrated by the following equation:

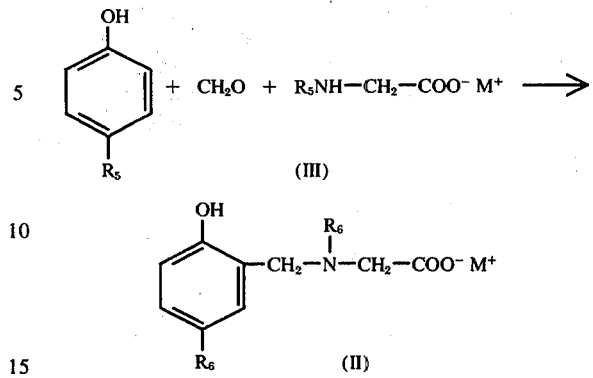

wherein $R_5$, $R_6$ and M have the significance above defined.

Examples of solvents for the above reaction include low molecular weight polyels such as ethylene glycol, diethylene glycol, dipropylene glycol, dibutylene glycol, tetraethylene glycol, glycerol, the liquid polyethylene glycols such as the plyoxyethylene glycols prepared by the addition of ethylene oxide to water, ethylene glycol or diethylene glycol, and the like; Cellosolve, butyl Cellosolve, Carbitol, methyl Carbitol, butyl Carbitol, and the like; ethanolamine, diethanolamine, triethanolamine: and dipolar aprotic solvents such as dimethyl formamide, dimethyl acetamide, N-methylpyrrolidone, dimethyl sulfoxide, and the like; and mixtures of any of the aforesaid solvents. While it is preferable to leave the salt (II) in its reaction solution for use in the cocatalyst combination, it can be isolated, if desired, from its diluent prior to use.

Typical examples of the starting phenol include: phenol, p-cresol, p-butylphenol, p-heptylphenol, p-octylphenol, p-nonylphenol, p-decylphenol, and p-dodecylphenol. Typical examples of the glycine salt III include: sodium glycinate, potassium glycinate, lithium glycinate, sodium N-methylglycinate, potassium N-methylglycinate, sodium N-butylglycinate, sodium N-octylglycinate, sodium N-dodecylglycinate, disodium iminodiacetate, and the like. The proportions of reactants employed in preparing the compound (II) are the molar ratios of phenol:formaldehyde: glycine derivative (III) from 1:1:1 to 1:2:2, and ratios therebetween.

A particularly preferred species of glycinate salt having the formula (II) is sodium N-(2-hydroxy-5-nonylphenyl)-methyl-N-methylglycinate. In a preferred embodiment of the invention, the salt (II) is employed in the cocatalyst in combination with a diluent. The diluent can be the reaction solvent, or mixtures thereof employed in the preparation of compound (II). A particularly preferred class of diluents consists of ethylene glycol, diethylene glycol, polyethylene glycol 400, and mixtures thereof. The concentration of the glycine salt dissolved in the diluent is not critical and can vary from about 25 percent to about 75 percent by weight. A particularly preferred species of solvent or diluent is diethylene glycol.

In a further preferred embodiment of the cocatalyst combination recited hereinabove there is additionally present a tertiary amine component. The presence of said amine is particularly advantageous when an epoxide compound is used during the trimerization reaction of the polyisocyanate as will be discussed hereinbelow. The tertiary amine component of the cocatalyst system is advantageously employed in the range of from about 1 weight percent to about 50 weight percent of the total cocatalyst combination of compounds (I) and (II), and preferably in the range of from about 3 weight percent to about 40 weight percent. The said tertiary amine component can be any of the tertiary amine trimerization catalysts known in the art and includes those amines set forth in U.S. Pat. No. 3,745,133 in Column 8, lines 1 – 73 and which are herein incorporated by reference. A particularly preferred class of tertiary amines consist of the following: N,N-dimethylethanolamine, N,N-dimethylbenzylamine, N,N-dimethylcyclohexylamine, N,N,N',N'-tetramethyl-1,3-butanediamine, N,N,N',N'-tetramethylpropane-diamine, N-methylmorpholine, and N-ethylmorpholine.

Particularly preferred species of tertiary amines include N,N-dimethylcyclohexylamine and N-ethyl-morpholine.

The catalyst combination described hereinabove specifically requires the use of two different catalyst components in combination, and the optional inclusion of a tertiary amine compound as set forth hereinabove. However, it is to be understood that this does not exclude the presence in the catalyst combination of additional components or agents capable of causing the trimerization of a polyisocyanate provided the components set forth hereinabove are also present.

The polyols employed in preparing polyisocyanurate foams in accordance with the present invention include any of the polyols set forth in U.S. Pat. No. 3,745,133, incorporated herein by reference, or any of those known in the art to be useful as a minor component in the preparation of polyisocyanurate foams; see supra. Said polyols can be added separately during the trimerization of the polyisocyanate component, or can be prereacted with the polyisocyanate to form an isocyanate-terminated prepolymer which is subsequently trimerized. The polyols are advantageously employed in the range from about 0.01 equivalent to about 0.3 equivalent per equivalent of isocyanate. A particularly preferred class of polyols consists of the polyethers, for example, the polyoxyalkylene glycols such as the polyoxyethylene glycols in the molecular weight range of from about 200 to about 600. These compounds are prepared by the addition of ethylene oxide to water, ethylene glycol or diethylene glycol. Also included are the polyoxypropylene glycols prepared by the addition of 1,2-propylene oxide to water, propylene glycol, etc.

In a preferred embodiment of the polyisocyanurate foams prepared in accordance with the present invention there is included an epoxide component. The foams produced thereby possess higher resistance to volume changes during subjection to elevated temperatures than those foams not containing an epoxide. Illustratively, the epoxide component can be any one of the epoxide compounds set forth in U.S. Pat. No. 3,745,133, the disclosure of which has been incorporated herein by reference. The epoxides shown in the latter patent have at least two epoxy groups which are present in substituents attached to a cyclic hydrocarbon or are fused to non-aromatic rings in a cyclic hydrocarbon. A particularly preferred type are the glycidyl ethers of novolac resins described in Column 6, lines 12 – 41 therein, and represented by the general formula:

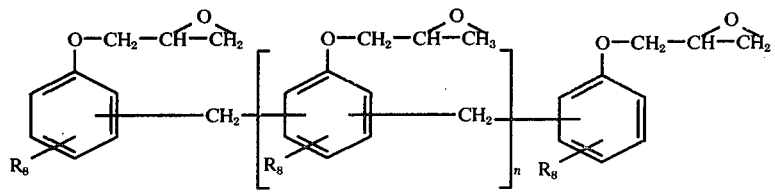

wherein n has an average value of from about 0.2 to 12 and $R_8$ represents from 0 to 4 substituents selected from halogen and lower alkyl groups.

The proportions of expoxide employed in carrying out the preparation of the polyisocyanurate foams of the invention vary from about 0.01 equivalent to about 0.1 equivalent of epoxide component for each equivalent of polyisocyanate present in he reaction mixture. When an epoxide is present in the reaction mixture, it is advantageous to employ the tertiary amine catalyst compound in conjunction with the cocatalyst combination of the invention as discussed hereinabove. The polyisocyanates employed in the preparation of polyisocyanurate foams in accordance with the present invention can be any of the organic polyisocyanates conventionally employed in the art for this purpose previously; see the art cited supra. Advantageously, in order to obtain foams having exceptionally high heat resistance and structural strength, the polyisocyanates employed in the process of the invention are polymethylene polyphenyl polyisocyantes, particularly those set forth in U.S. Pat No. 3,745,133. A particularly preferred form of polymethylene polyphenyl polyisocyanate is one having an acidity, expressed as "% hot HCl" of less than about 0.1 percent. Various methods of reducing the acidity to such levels are known in the art. A particularly useful process is that set forth in German OLS 2,249,375. The latter process comprises treating the polyisocyanate with from 0.25 to 1 equivalent of monomeric epoxide for each equivalent of acid present in the polyisocyanate.

In carrying out the preparation of polyisocyanurate foams in accordance with the process of the invention, and in particular polyisocyanurate foams for the preparation of foam laminates, the procedures and equipment conventional in the art are employed. The proportions of cocatalyst are so chosen that, for each equivalent of polyisocyanate present in the reaction mixture, there is employed from 0.00075 to 0.03 equivalent, preferably from 0.001 to 0.015 equivalent of said compound (I), from 0.0015 to 0.025 equivalent, preferably from 0.002 to 0.0015 equivalent of said compound (III), and, when a tertiary amine is optionally present, from 0.0008 to 0.03 equivalent, preferably from 0.001 to 0.015 equivalent of said tertiary amine component.

Foaming agents, and other optional additives such as dispersing agents, cell stabilizers, surfactants, flame retardants, and the like, can be employed according to the teachings of the incorporated reference. A particularly preferred class of flame retardant additives are the phosphorus containing flame retardants, such as: tris-(2-chloroethyl)phosphate, tris(2-chloroproply)phosphate, tris(2,3-dibromoproply)phosphate, tris(1,3-dichloroisoproply)-phosphate, and the like.

As set forth above, the use of the cocatalyst combination of the invention results in the facile formation of foam laminate board material. It provides the foam rise characteristic necessary in the polyisocyanurate foams of the invention to enable the otherwise difficult, if not impossible, continuous production of foam laminate board possessing uniform thickness, excellent adhesive porperties to all the facer materials known to those skilled in the art, and wrinkle-free contact between resultant foam and facer material. The catalyst combination of the invention also provides the advantageous properties listed hereinabove over a wide range of laminate board thickness from about ½ inch to 4 inches.

Standard continuous laminating machinery (such as that equipment provided by the Admiral Equipment Corporation, Akron, Ohio) can be employed in preparing the laminate board referred to hereinabove. The polyisocyanurate foams made in accordance with the invention show excellent adhesion to a wide variety of facer materials known to those skilled in the art such as: aluminum foil in various thicknesses, tar paper, Kraft paper, asphalt felt, various types of felt, paper cupstock, transite, polyethylene, polypropylene, polyvinylchloride, fiber-glass scrim in aluminum, and the like.

Thus, the cellular products of the invention are particularly suitable for the preparation of foam laminate board material where thermal resistance, low flame spread and low smoke generation on combustion are required. For example, the cellular laminate board stock can be employed as thermal barriers and insulating materials for roof decks and wall insulation in all types of construction and especially industrial buildings. The excellent resistance to distortion and volume change under conditions of elevated temperature, make the laminate board material particularly suitable for use in roof deck application where the material is subject to extremes in temperature range, and other applications where similar environmental conditions occur.

While the cocatalyst combinations of the invention are particularly useful in the preparation of cellular products, and, more particularly, laminates, they can also be employed in the preparation of non-cellular materials. The preparation of non-cellular polymers made in accordance with the present invention is carried out by using standard techniques known to those skilled in the art. Solid polymers are otained by carrying out the invention in the absence of the blowing agent. The reactants can be cast, molded, coated, or otherwise deposited by methods known to those skilled in the art, to form a solid polyisocyanurate casting, molding, coating, or other form of solid polyisocyanurate. Such products find use for example, in high temperature resistant laminates prepared from reinforcing layers of heat resistant fabric such as glass fabric, graphite fabric, and the like, and layers of polyisocyanurate of the invention.

The following preparations and examples describe the manner and process of making and using the invention and set forth the best mode contemplated by the inventors of carrying out the invention but are not to be construed as limiting. The pertinent test procedures relating to the invention are defined as follows.

ACIDITY DETERMINATION

Two grams of the isocyanate to be analyzed is mixed with 75 ml. each of toluene and methanol in a 250 ml. Griffin beaker. The beaker is covered with a watch glass and the mixture refluxed for 5 minutes with stirring. The mixture is then allowed to cool to room temperature. Employing a Fisher Accumet pH meter with combination electrode, the mixture is titrated at a constant rate with 0.02 N potassium hydroxide in methanol to a pH of 7.7. A standard blank is prepared by carrying a mixture of 75 ml. each of toluene and methanol through the same procedure outlined above. The acid content of the isocyanate is then calculated according to the equation:

$$\% \text{ Acid} = (A - B) \times 0.0365$$

wherein $A$ is the number of milliters of potassium hydroxide solution used to titrate the isocyanate mixture and B is the number of milliters of potassium hydroxide used to titrate the standard blank.

The number of equivalents of acid present in a given polyisocyanate are determined by the formula:

$$\text{Equivalents Acid} = \frac{(\% \text{ Acid}) \ (\text{Grams Isocyanate to be treated})}{36.5}$$

PREPARATION 1

Sodium N-(2-hydroxy-5-nonylphenyl)methyl-N-methyl glycinate

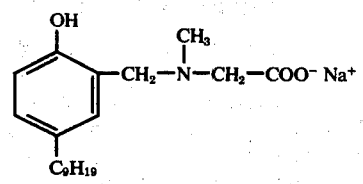

A 3 liter, 3-neck flask was fitted with a mechanical stirrer, nitrogen purge, thermometer, and take-off condenser with a receiver. The flask was charged with 385 g. of diethylene glycol, 410 g. (1.86 moles) of nonyl phenol, and 675 g. of an aqueous solution of sodium N-methyl glycinate which contained 32% by weight of the salt, or 216 g. (1.94 moles). During rapid stirring, the mixture was heated under atmospheric pressure, and at about 135° C, a major portion of the water was removed by distillation. The contents of the flask were cooled to about 90° C and 160 g. of 37% aqueous formaldehyde solution, equivalent to 59.2 g. (1.95 moles) of formaldehyde was added over a period of about 30 minutes. The flask contents were then heated to 110° – 120° C and under atmospheric pressure most of the water was removed by distillation. Vacuum was slowly applied and at 95° – 120° C and 3 mm. pressure, the remaining water and volatile materials were removed. About 255 g. of diethylene glycol was stirred into the viscous residue to provide sodium N-(2-hydroxy-5-nonylphenyl)methyl-N-methyl glycinate in quantitative yield as a 50% solution in diethylene glycol; hydroxyl E.W. = 90; viscosity, cstk. at 25° C = 13,048. This solution of glycinate salt can be used directly as a catalyst component. An isolated crude yield of salt was obtained as a semicrystalline orange solid when the diethylene glycol was removed by heating the solution in vacuo. The isolated material was also used as a cocatalyst component.

PREPARATION 2 – 13

Using the procedure of Preparation 1 and substituting the phenols, the amino acid salts and formaldehyde with the solvents as set forth in the following table, the corresponding glycine and iminodiacetate salts are obtained.

| | | | | | Product | |
|---|---|---|---|---|---|---|
| Prep. | Phenol (1 mole) | Amino-acid (moles) | Formaldehyde (moles) | % Solvent | OH,E.W. | Visc., cstk. at 25° C |
| 2 | phenol | NaG[1] (1.0) | F (1.0) | 64[2] | 89 | 24,733 |
| 3 | phenol | NaG (1.9) | F (1.9) | 69[3] | 76 | 11,872 |
| 4 | phenol | NaS[4] (1.0) | F (1.0) | 62[2] | 101 | 27,735 |
| 5 | phenol | NaS (1.9) | F (1.9) | 67[2] | 124 | 22,265 |
| 6 | phenol | IDAK$_2$[5] (1.9) | F (1.9) | 65[3] | 77 | 627 (50° C) |
| 7 | nonyl phenol | NaG (1.0) | F (1.0) | 60[2] | 95 | 1,532 (50° C) |
| 8 | nonyl phenol | NaS (1.9) | F (1.9) | 55[3] | 99 | 16,737 |
| 9 | nonyl phenol | NaS (1.0) | F (1.0) | 44[6] | 246 | 6,280 (cps/27° C) |
| 10 | nonyl phenol | KG[7] (1.0) | F (1.0) | 55[2] | 96 | 21,903 |
| 11 | nonyl phenol | KS[8] (1.0) | F (1.0) | 55[2] | 120 | 1,030 (50° C) |
| 12 | nonyl phenol | IDAK$_2$ (1.0) | F (1.0) | 48[2] | 124 | 11,426 (50° C) |
| 13 | nonyl phenol | IDAK$_2$ (1.9) | F (1.9) | 63[2] | 115 | 24,471 |

[1]Sodium glycinate
[2]35% ethylene glycol solution in polyethylene glycol 400
[3]Diethylene glycol
[4]Sodium sarcosinate
[5]Dipotassium iminodiacetate
[6]Butyl Carbitol
[7]Potassium glycinate
[8]Potassium sarcosinate

PREPARATION 14

Using the apparatus and procedure of Preparation 1, 201 g. (1.86 moles) of p-cresol, along with 180 g. of diethylene glycol, and 675 g. of an aqueous solution of sodium N-methyl glycinate which contained 32% by weight of the salt, or 216 g. (1.94 moles), was stripped of the major portion of water. One hundered and sixty grams of 37% aqueous formaldehyde solution, equivalent to 59.2 g. (1.95 moles) of formaldehyde, was added over a period of about 30 minutes. The reaction mixture was heated and vacuum distilled to remove volatiles according to the procedure of Preparation 1. About 250 g. of diethylene glycol was stirred into the viscous residue to provide sodium N-(2-hydroxy-5-methylphenyl)methyl-N-methyl glycinate in quantitative yield as a 50% solution in diethylene glycol; hydroxyl E.W. = 80.

PREPARATION 15

Potassium N-phenyl-2-ethylhexamide

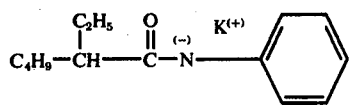

A 1 liter 3 neck flask was fitted with a mechanical stirrer, a thermometer, an addition funnel, and a gas inlet tube. The apparatus was thoroughly dried and then the flask was charged with 182.2 g. (1.0 mole) of potassium 2-ethylhexanoate dissolved in 168 g. of ethylene glycol. During constant stirring and under a slight nitrogen pressure, 119.1 g. (1.0 mole) of phenyl isocyanate was slowly added dropwise. The reaction mixture exothermed to 60° C and carbon dioxide was evolved. The resulting clear solution started to precipitate small crystals upon cooling. However, the addition of 175 g. of dimethylformamide yielded a clear yellow solution having the following properties: Equivalent Weight = 141; Acid No. = 3.4; viscosity at 25° C = 53 cstk.

This solution of potassium N-phenyl-2-ethylhexamide can be used directly as a catalyst component. A crude yield of the salt was obtained when ethylene glycol and dimethylformamide were removed by heating the solution at steam-bath temperature under 0.2 mm. pressure and protecting the product from atmospheric moisture. A semicrystalline orange residue remained, wt. = 275 g. It was stored in a vacuum desiccator until used as a cocatalyst component.

PREPARATION 16

Potassium N-butyl-2-ethylhexamide

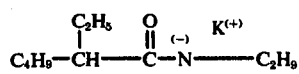

A 1 liter 3 neck flask equipped as in Preparation 15 was charged with 182.2 g. (1.0 mole) of potassium 2-ethylhexanoate dissolved in 158 g. of ethylene glycol. During constant stirring 99.1 g. (1.0 mole) of butyl isocyanate was slowly added dropwise. The reaction mixture evolved carbon dioxide and exothermed to about 50° C. The resulting clear yellow solution showed an increase in viscosity over the starting solution and had the following properties: Equivalent Weight = 90; Acid No. = 3.8; Viscosity at 25° C = 560 cstk. This solution of potassium N-butyl-2-ethylhexamide can be used directly as a catalyst component. A crude yield of the salt was obtained when the ethylene glycol was removed by heating the solution at steam-bath temperature under 0.2 mm. pressure and protecting the product from moisture. A semicrystalline orange residue remained; wt. = 267 g. It was stored in a vacuum desiccator until used as a cocatalyst component.

PREPARATION 17 - 28

Using the procedure of Preparation 15 wherein 168 g. of ethylene glycol and 175 g. of dimethylformamide were used together as co-solvents and substituting the alkali metal carboxylic acid salts and organic isocyanates set forth in the following table, the corresponding amide salts were obtained as listed therein. The salts are characterized by the percent by weight of solvent content which itself consisted of 49 percent by weight of ethylene glycol and 51 percent by weight of dimethylformamide. Removal of the solvent to provide the crude yield of amide salt was readily accomplished by heating the solution in vacuo.

core material after the facers have been removed. Therefore, the facer material itself has no effect on this data.

Component A consisted of an organic polyisocyanate prepared by treating polymethylene polyphenyl isocyanate containing about 40 percent by weight of methylenebis-(phenyl isocyanate) with a minor amount of monomeric epoxide in accordance with the method taught in copending U.S. application Ser. No. 190,379

| Prep. | Acid Salt (1.0 mole) | Isocyanate (1.0 mole) | Product | Solvent % (by wt.) |
|---|---|---|---|---|
| 17 | Na[1] acetate | Phenyl- | Na N-Phenylacetamide | 68 |
| 18 | K[2] acetate | Phenyl- | K N-Phenylacetamide | 66 |
| 19 | Li[3] acetate | Phenyl- | Li N-Phenylacetamide | 70 |
| 20 | K propionate | Phenyl | K N-Phenylpropionamide | 65 |
| 21 | Na 2-ethylhexanoate | Phenyl | Na N-Phenyl-2-ethylhexamide | 59 |
| 22 | K 2-ethylhexanoate | p-Tolyl- | K N-(p-Tolyl)-2-ethylhexamide | 55 |
| 23 | Li 2-ethylhexanoate | α-Naphthyl- | Li N-(α-Naphthyl)-2-ethylhexamide | 55 |
| 24 | K decanoate | 4-Biphenylyl- | K N-(4-Biphenylyl)-decanoamide | 49 |
| 25 | K β-phenylpropionate | Phenyl- | K N-Phenyl-β-phenylpropionamide | 57 |
| 26 | K cyclohexylacetate | Phenyl- | K N-Phenyl-cyclohexylacetamide | 57 |
| 27 | K phenylacetate | Phenyl- | K N-Phenyl-phenylacetamide | 58 |
| 28 | K α-naphthylacetate | Phenyl- | K N-Phenyl-α-naphthylacetamide | 53 |

Footnotes:
[1] Na: Sodium
[2] K: Potassium
[3] Li: Lithium

PREPARATION 29 – 36

Using the procedure of Preparation 16 wherein 158 g. of ethylene glycol was used as solvent, and substituting the potassium carboxylic acid salts and organic isocyanates set forth in the following table, the corresponding amide salts were obtained as listed therein. The salts are characterized by the percent by weight of solvent content of ethylene glycol. Removal of the solvent to provide the crude yeild of amide salt was readily accomplished by heating the solution in vacuo.

filed Oct. 18, 1971 for reducing acidity. The resultant polyisocyanate had an isocyanate equivalent of about 141 and about 0.07 percent acidity. Component A also contained a surfactant and freon. The B component contained the polyol portion, while the C component contained the catalyst combination for the specific embodiment of the invention. Foams A, B and C of Table I illustrate three laminate foams prepared in accordance with the invention using three different polyol components as set forth hereinbelow.

| Prep. | Acid Salt (1.0 mole) | Isocyanate (1.0 mole) | Product | Solvent % (by wt.) |
|---|---|---|---|---|
| 29 | K[1] acetate | Butyl- | K N-Butylacetamide | 50 |
| 30 | K propionate | Methyl- | K N-Methylpropionamide | 55 |
| 31 | K propionate | Ethyl- | K N-Ethylpropionamide | 53 |
| 32 | K propionate | Butyl- | K N-Butylpropionamide | 48 |
| 33 | K propionate | t-Butyl- | K N-t-Butylpropionamide | 48 |
| 34 | K propionate | Hexyl- | K N-Hexylpropionamide | 45 |
| 35 | K propionate | Octyl- | K N-Octylpropionamide | 40 |
| 36 | K β-phenylpropionate | Butyl- | K N-Butyl-β-phenyl-propionamide | 39 |

Footnote:
[1] K: Potassium

EXAMPLE 1

The following high temperature resistant rigid foam laminates were prepared in accordance with the invention as set forth in Table I. An admiral laminating machine was used with A, B, and C component temperatures of 60° F, 60° F, and 78° F, respectively. Throughput was 20 lbs./min. with a modified 3-stage conical mixer operating at 4,000 r.p.m. and having an outlet nozzle diameter of ¼ inches. The conveyor speed was 22 – 23 ft./min. and the curing oven air temperature was operated at 200° F. Laminate thickness was 1 inches and 0.0015 inches aluminum foil facers were applied on each face in Foam A while St. Regis Cupstock facers were used in Foams B and C. The foam physical test data reported in Table I is for the foam

TABLE I

| Foams | A | B | C |
|---|---|---|---|
| Ingredients: | | | |
| Component A: | | | |
| Polyisocyanate | 134 | 134 | 134 |
| L-5340[1] | 1 | 1 | 1 |
| Freon 11-B[2] | 21.5 | 21 | 25 |
| Component B: | | | |
| Polyester I[3] | 27 | | |
| Carbowax 600[4] | 15 | | 15 |
| Polyester II[5] | | 27 | 27 |
| Polyol[6] | | 20 | |
| Fyrol CEF[7] | 10 | 15 | 10 |
| DC-193[8] | 1 | 1 | 1 |
| Freon 11-B | 9 | 16 | 9 |
| Component C: | | | |
| Catalyst I[9] | .1 | 1.8 | 1 |
| Catalyst II[10] | 8 | 8.2 | 8 |
| PPG-1025[11] | 7 | | |
| CP-3001[12] | | 10 | |
| Fyrol CEF | | | 5 |

TABLE I-continued

| Foams | A | B | C |
|---|---|---|---|
| Cream (sec.) | :15 | :20 | :17 |
| Initiation (sec.) | :18 | :22 | :19 |
| Gel (sec.) | :46 | :50 | :54 |
| Rise (min:sec.) | :57 | 1:10 | :65 |
| Tack Free (min:sec.) | 1:45 | | 1:40 |
| Firm (min:sec.) | 1:15 | | :75 |
| Density, p.c.f. | 2.13 | 1.88 | 2.07 |
| Compressive str. (p.s.i.) | | | |
| ∥ to rise | 42.7 | 36.9 | 34 |
| ⊥ to rise | 17.6 | 13.0 | 11 |
| Oxygen Index (%)[13] | 30.3 | 27.8 | 31.1 |
| Friability (% wt. loss)[14] | 4.5 | 9 | 8 |
| 200° F Dry Heat Aging: | | | |
| 7 days  ΔX (%) | 3.1 | | 3.5 |
| ΔY (%) | −1.6 | | −1.5 |
| ΔZ (%) | 3.3 | | 3.2 |
| ΔV (%) | 4.9 | | 5.2 |
| 14 days  ΔX (%) | 3.1 | 2.8 | 3.8 |
| ΔY (%) | −2.1 | −1.6 | −2.0 |
| ΔZ (%) | 3.2 | 2.9 | 3.6 |
| ΔV (%) | 4.2 | 4.1 | 5.4 |

Footnotes:
[1]L-5340: A rigid foam silicone surfactant supplied by Union Carbide Corporation; see Union Carbide Bulletin F-42172A, October 1970.
[2]Freon 11-B: Trichlorofluoromethane, product of DuPont Corporation.
[3]Polyester I: The polyester used in this example was a blend consisting of a mixture of (i) 24.8 parts of the product of esterifying 1 mole of chlorendic anhydride with 1.1 moles of diethylene glycol and 2.5 moles of propylene oxide and (ii) 2.2 parts of diethylene glycol.
[4]Carbowax 600: A polyethylene glycol product of Union Carbide having a molecular weight range of 570–630.
[5]Polyester II: The polyester obtained by esterifying 1 mole of chlorendic anhydride with 1.1 moles of diethylene glycol and 2.5 moles of propylene oxide.
[6]Polyol: This polyol consists of a blend of 10 parts of a polyol formed by the reaction of 3 moles of ethylene oxide with trimethylolpropane having an equivalent weight of about 93, with 10 parts of polyol of equivalent weight of 133 and average functionality of 5.3 which is a blend of (i) an adduct of propylene oxide and a methylene bridged polyphenyl polyamine mixture obtained by acid condensation of aniline and formaldehyde and (ii) a glycerol-propylene oxide adduct prepared according to the method of Example 68 in U.S. 3,423,344.
[7]Fyrol CEF: tris(betachloroethyl)phosphate; see Stauffer Production Data Sheet entitled Fyrol CEF, June 15, 1967.
[8]DC-193: A silicone surfactant sold by Dow Corning Corporation; see: "Dow Corning 193 Surfactant", Bulletin: 05-146, February, 1966.
[9]Catalyst I: A solution consisting of 43 percent by weight of potassium N-phenyl-2-ethylhexamide, 28 percent by weight of ethylene glycol, and 29 percent by weight of dimethyl formamide.
[10]Catalyst II: A 50 percent solution of sodium N-(2-hydroxy-5-nonylphenyl)methyl-N-methyl glycinate in diethylene glycol.
[11]PPG-1025: A polypropylene glycol manufactured by Jefferson Chemical Co., having an E.W. = 500 and functionality of 2.
[12]CP-3001: A polypropoxylated glycerine polyol of E.W. = 1000, functionality of 3 and partially terminated in primary hydroxyls. Supplied by Dow Chemical Co.
[13]Flammability test conducted according to the ASTM D-2863 procedure and reported as the percent oxygen content required to sustain sample combustion.
[14]Friability: Percent weight loss of sample as determined in accordance with ASTM Test Method C 421.

EXAMPLE 2

Foam D of Table II is a further example of a high temperature resistant rigid foam laminate made according to the procedure of Example 1. The facers consisted of 0.0015 inches aluminum foil but all foam test data was obtained on the foam core as in Exaple 1. A low acidity polyisocyanate as previously described was employed and in addition, a monomeric polyepoxide (DEN-431) was used which resulted in foam material possessing better dry heat aging characteristics as compared to the foams of Example 1.

TABLE II

| Foam | D |
|---|---|
| Ingredients: | |
| Component A: | |

TABLE II-continued

| Foam | D |
|---|---|
| Polyisocyanate | 134 |
| L-5340 | 1 |
| Freon 11-B | 27.5 |
| Component B: | |
| Polyester III[1] | 35 |
| Fyrol CEF | 15 |
| DEN-431[2] | 8 |
| DC-193 | 1 |
| Freon 11-B | 5.5 |
| Component C: | |
| Catalyst I | 6.75 |
| Catalyst II | 2.25 |
| Cream (sec.) | :14 |
| Initiation (sec.) | :16 |
| Gel (sec.) | :30 |
| Rise (sec.) | :37 |
| Firm (sec.) | :37 |
| Tack Free (sec.) | :50 |
| Density, p.c.f. | 1.94 |
| Compressive str. (p.s.i.) | |
| ∥ to rise | 38.6 |
| ⊥ to rise | 13.2 |
| Oxygen Index (%) | 30.2 |
| Friability (%) | 10.6 |
| 200° F Dry Heat Aging: | |
| 7 days ΔX (%) | 2.1 |
| ΔY (%) | −1.1 |
| ΔZ (%) | 2.5 |
| ΔV (%) | |
| 14 days ΔX (%) | 2.6 |
| ΔY (%) | −1.3 |
| ΔZ (%) | 2.7 |
| ΔV (%) | 4.0 |

Footnotes:
[1]Polyester III: The polyester used in this example was 24.8 parts of the product of esterifying 1 mole of chlorendic anhydride with 1.1 moles of diethylene glycol and 2.5 moles of propylene oxide, blended with 8 parts of a polyol formed by the reaction of 3 moles of ethylene oxide with trimethylolpropane having an equivalent weight of about 93 and 2.2 parts of diethylene glycol.
[2]DEN 431: Dow epoxy novolac resin, viscosity of 76,500 cps. at 25° C, see "D.E.N. Epoxy Novolac Resins", The Dow Chemical Company, 1967, pgs. 1–2.

EXAMPLE 3

Foams E and F of Table III are examples of high temperature resistant rigid foam laminates made by the procedure of Example 1. The facers in both foams were 1.5 mil. aluminum foil. The low acidity polyisocyanate used in previous examples was used in the preparation of Foams E and F and an additional catalyst component consisting of a tertiary amine trimerization catalyst was added. Foam F possessed the highest resistance to heat distortion when compared to previous foams of these examples.

TABLE III

| Foams | E | F |
|---|---|---|
| Ingredients: | | |
| Component A: | | |
| Polyisocyanate | 134 | 134 |
| L-5340 | 1 | |
| Freon 11-B | 23 | 25 |
| Fyrol CEF | 15 | |
| Component B: | | |
| Polyester III | 35 | |
| Carbowax 400[1] | | 25 |
| DEN-431 | 8 | 8 |
| DC-193 | 1 | 1 |
| Freon 11-B | 10 | 4 |
| Component C: | | |
| Catalyst I | 6.75 | 0.74 |
| Catalyst II | 2.25 | 2.96 |
| N-ethyl morpholine | 1.5 | |
| N,N-dimethyl cyclohexylamine | | 0.111 |
| Carbowax 400 | | 3.695 |
| Cream (sec.) | :14 | :14 |
| Initiation (sec.) | :16 | :16 |
| Gel (sec.) | :30 | :34 |
| Rise (sec.) | :40 | :45 |
| Firm (sec.) | :40 | :45 |
| Tack Free (min:sec.) | :90 | 4:00 |

TABLE III-continued

| Foams | E | F |
|---|---|---|
| Density, p.c.f. | 2.0 | 2.05 |
| Compressive str. (p.s.i.) | | |
| ∥ to rise | 41 | 36.6 |
| ⊥ to rise | 14 | 12.3 |
| 0.1 (%) | 30 | 25.6 |
| Friability | 4.0 | 4.4 |
| E-84 (FSR)[2] | 25 | 25 |
| 200° F Dry Heat Aging: | | |
| 7 days ΔX (%) | 2.1 | 1.5 |
| ΔY (%) | | −0.9 |
| ΔZ (%) | 2.7 | 1.4 |
| ΔV (%) | 5.0 | |
| 14 days ΔX (%) | 2.3 | 1.8 |
| ΔY (%) | | −1.1 |
| ΔZ (%) | 2.9 | 1.7 |
| ΔV (%) | 5.4 | 2.3 |

Footnotes:
[1]Carbowax 400: A 400 M.W. polyethylene glycol supplied by Union Carbide.
[2]E-84 (FSR): Flame spread rating of a sample as determined in accordance with the ASTM E-84 Tunnel Test.

We claim:

1. In a process for the preparation of a cellular polymer in which the major recurring polymer unit is isocyanurate which process comprises bringing together in the presence of a blowing agent, a polyisocyanate, a trimerization catalyst, and from about 0.01 equivalent to about 0.3 equivalent of a polyol per equivalent of isocyanate, the improvement which consists essentially of employing as the catalyst, a combination of the following ingredients:
   a. from 0.00075 to 0.03 equivalent per equivalent of said polyisocyanate of an amide salt having the formula

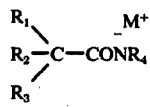

wherein M is an alkali metal, $R_1$, $R_2$ and $R_3$ can be the same or different and are selected from the group consisting of H, lower alkyl, aryl, aralkyl, and cycloalkyl, and $R_4$ is selected from the group consisting of lower alkyl and aryl; and
   b. from 0.0015 to 0.025 equivalent per equivalent of said polyisocyanate of a glycine salt having the formula

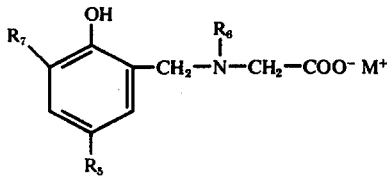

wherein M is an alkali metal, $R_5$ is selected from the class consisting of hydrogen and alkyl having from 1 to 12 carbon atoms, inclusive, $R_6$ is selected from the class consisting of hydrogen, alkyl having from 1 to 12 carbon atoms, inclusive and —$CH_2$—COO$^-$M$^+$, and $R_7$ is selected from the class consisting of hydrogen and the group

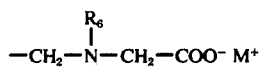

2. The process according to claim 1 wherein a monomeric polyepoxide is present in the polymer foam forming reaction mixture.

3. The process according to claim 2 wherein the catalyst combination also contains from 0.0008 to 0.03 equivalent per equivalent of said polyisocyanate of a tertiary amine trimerization catalyst selected from the group consisting of N,N-dialkylpiperazines, trialkylamines, 1,4-diazabicyclooctane, N,N′,N″-tris(dialkylaminoalkyl)hexahydrotriazines, mono-, di-, and tri-(dialkylaminoalkyl)monohydric phenols or thiophenols, N,N,N′,N′-tetraalkylalkylenediamines, N,N-dialkylcyclohexylamines, N-alkylmorpholines, N,N-dialkylalkanolamines, and N,N,N′,N′-tetraalkyl guanidines.

4. The process according to claim 1 wherein said polyisocyanate is polymethylene polyphenyl isocyanate containing about 30 percent to about 35 percent by weight of methylenebis (phenyl isocyanate).

5. The process according to claim 1 wherein the polyisocyanate has an acidity less than about 0.10 percent.

6. The process according to claim 1 wherein the polyisocyanate has been previously mixed at room temperature with about 0.25 equivalent to about 1.0 equivalent of a monomeric epoxide per equivalent of acid present in said polyisocyanate to reduce acidity to less than about 0.10 percent.

7. The process according to claim 6 wherein said epoxide is 3,4-epoxycyclohexylmethyl-3,4-epoxycyclohexane carboxylate.

8. The process according to claim 1 wherein the amide salt is potassium N-phenyl-2-ethyl-hexamide.

9. The process according to claim 1 wherein the glycine salt is sodium N-(2-hydroxy-5-nonylphenyl)-methyl-N-methyl glycinate.

10. The process according to claim 1 wherein the amide salt is present in the form of a solution containing from about 25 percent to about 75 percent by weight in a diluent.

11. The process according to Claim 10 wherein said diluent is a mixture of ethylene glycol and dimethyl-formamide.

12. The process according to claim 1 wherein said glycinate is present in the form of a solution from about 25 percent to about 75 percent in a diluent.

13. The process according to Claim 12 wherein said diluent is diethylene glycol.

14. In a process for the preparation of a cellular polymer in which the major recurring polymer unit is isocyanurate which process comprises bringing together in the presence of a blowing agent, a polyisocyanate, a trimerization catalyst, and from about 0.01 equivalent to about 0.3 equivalent of a polyol per equivalent of isocyanate, the improvement which consists essentially of employing as the catalyst, a combination of the following ingredients:
   a. from 0.00075 to 0.03 equivalent per equivalent of said polyisocyanate of potassium N-phenyl-2-ethyl-hexamide; and
   b. from 0.0015 to 0.025 equivalent per equivalent of said polyisocyanate of sodium N-(2-hydroxy-5-nonylphenyl)methyl-N-methylglycinate.

15. The process according to claim 14 wherein there is also present a glycidyl ether of a novolac resin having a functionality of at least two.

16. The process according to claim 15 wherein the catalyst combination also contains from 0.0008 to 0.03 equivalent per equivalent of said polyisocyanate of N-ethylmorpholine.

17. The process according to claim 15 wherein the catalyst combination also contains from 0.0008 to 0.03 equivalent per equivalent of said polyisocyanate of N,N-dimethylcyclohexylamine.

18. The process according to Claim 14 wherein the polyisocyanate is polymethylene polyphenyl isocyanate containing from about 30 percent to about 85 percent by weight of methylenebis (phenyl isocyanate).

19. The process according to Claim 18 wherein said polyisocyanate has an acidity less than about 0.10 percent.

20. The process according to Claim 18 wherein said polyisocyanate has been previously mixed at room temperature with about 0.25 equivalent to about 1.0 equivalent of a monomeric epoxide per equivalent of acid present in said polyisocyanate to reduce acidity to less than about 0.10 percent.

21. The process according to claim 20 wherein said monomeric epoxide is 3,4-epoxycyclohexylmethyl-3,4-epoxycyclohexane carboxylate.

22. The process according to claim 14 wherein said amide salt is present in the form of a solution from about 25 percent to about 75 percent by weight in a diluent.

23. The process according to claim 22 wherein said diluent is a mixture of ethylene glycol and dimethylformamide.

24. The process according to claim 14 wherein said glycinate is present in the form of a solution from about 25 percent to about 75 percent by weight in a diluent.

25. The process according to claim 24 wherein said diluent is diethylene glycol.

26. The process according to claim 14 wherein said polyol is a polyoxyalkylene glycol having a molecular weight from about 200 to about 600.

* * * * *

UNITED STATES PATENT OFFICE
CERTIFICATE OF CORRECTION

Patent No. 4,011,180    Dated March 8, 1977

Inventor(s) Robert J. Lockwood, Harold E. Reymore, Jr., and Edward J. Thompson

It is certified that error appears in the above-identified patent and that said Letters Patent are hereby corrected as shown below:

Column 2, line 37:

lower alkyl

Should read:

"lower alkyl"

Column 2, line 40:

aryl

Should read:

"aryl"

Column 2, line 43:

aralkyl

Should read:

"aralkyl"

Column 2, line 46:

cycloalkyl

Should read:

"cycloalkyl"

Column 2, line 48:

alkali metal

Should read:

"alkali metal"

Column 2, line 50:

alkyl having .....inclusive

Should read:

"alkyl having....inclusive"

Column 2, line 56:

form laminates

Should read:

form of laminates

UNITED STATES PATENT OFFICE
CERTIFICATE OF CORRECTION

Patent No. 4,011,180        Dated March 8, 1977

Inventor(s) Robert J. Lockwood, Harold E. Reymore, Jr., and Edward J. Thompson

It is certified that error appears in the above-identified patent and that said Letters Patent are hereby corrected as shown below:

Column 4, lines 22-25:

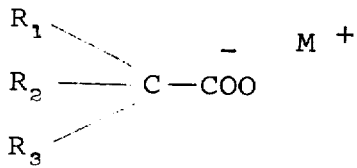

Should read:

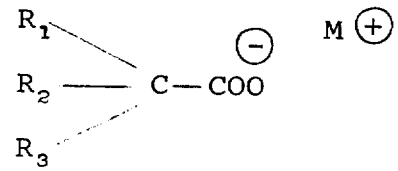

Column 4, line 42:

burtyl

Should read:

butyl

Column 6, line 5:

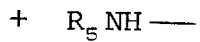

Should read:

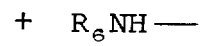

Column 6, line 15:

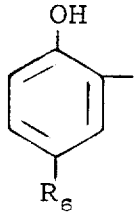

Should read:

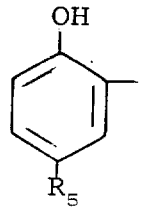

Column 6, line 20:

polyels

Should read:

polyols

Column 6, line 23:

plyoxyethylene

Should read:

polyoxyethylene

UNITED STATES PATENT OFFICE
CERTIFICATE OF CORRECTION

Patent No. 4,011,180          Dated March 8, 1977

Inventor(s) Robert J. Lockwood, Harold E. Reymore, Jr., and Edward J. Thompson

It is certified that error appears in the above-identified patent and that said Letters Patent are hereby corrected as shown below:

| | |
|---|---|
| Column 8, line 25: | Should read: |
| he | the |
| Column 8, line 59: | Should read: |
| 0.0015 | 0.015 |
| Column 8, lines 59 and 60: | Should read: |
| compound (III) | compound (II) |
| Column 9, line 8: | Should read: |
| characteristic | characteristics |
| Column 12, line 44: | Should read: |
| $-N-C_2H_9$ | $-N-C_4H_9$ |
| Column 13, line 36: | Should read: |
| yeild | yield |
| Column 13, line 57: | Should read: |
| admiral | Admiral |
| Column 15, line 58: | Should read: |
| Exaple | Example |

UNITED STATES PATENT OFFICE
CERTIFICATE OF CORRECTION

Patent No. 4,011,180  Dated March 8, 1977

Inventor(s) Robert J. Lockwood, Harold E. Reymore, Jr., and Edward J. Thompson

It is certified that error appears in the above-identified patent and that said Letters Patent are hereby corrected as shown below:

Column 17, Table III, line 7:

0.1 (%)

Should read:

O.I. (%)

Column 18, Claim 4, line 17:

to about 35 percent

Should read:

to about 85 percent

Signed and Sealed this

Thirty-first Day of May 1977

[SEAL]

Attest:

RUTH C. MASON
Attesting Officer

C. MARSHALL DANN
Commissioner of Patents and Trademarks